United States Patent [19]

Hansson

[11] Patent Number: 5,487,182

[45] Date of Patent: Jan. 23, 1996

[54] HANDS-FREE MODULE

[75] Inventor: Hans M. Hansson, Lund, Sweden

[73] Assignee: Telefonaktiebolaget LM Ericsson, Stockholm, Sweden

[21] Appl. No.: 181,350

[22] Filed: Nov. 12, 1993

Related U.S. Application Data

[63] Continuation of Ser. No. 715,585, Jun. 14, 1991, abandoned.

[30] Foreign Application Priority Data

Jun. 25, 1990 [SE] Sweden .................................. 9002243

[51] Int. Cl.[6] .............................. H04B 1/38; H04M 9/08
[52] U.S. Cl. ............................ 455/90; 455/349; 455/351; 379/58; 379/420
[58] Field of Search .................... 455/89, 90, 74, 455/79, 116, 127, 345, 346, 348, 349, 350, 351; 379/58, 59, 61, 420, 430, 432, 433; 381/69, 69.1, 187, 188, 59

[56] References Cited

U.S. PATENT DOCUMENTS

| | | | |
|---|---|---|---|
| 2,895,007 | 7/1959 | Soderbaum | 379/420 |
| 3,908,094 | 9/1975 | Deluegue | 379/420 |
| 4,325,142 | 4/1982 | Nakazawa | 455/89 |
| 4,654,883 | 3/1987 | Iwata | 455/90 |
| 4,754,484 | 6/1988 | Larkin et al. | 379/420 |
| 4,907,266 | 3/1990 | Chen | 379/430 |
| 4,930,156 | 5/1990 | Norris | 379/420 |

FOREIGN PATENT DOCUMENTS

| | | | |
|---|---|---|---|
| 62-43941 | 2/1987 | Japan | 379/420 |
| 1-213056 | 8/1989 | Japan | 379/420 |
| 2-165757 | 6/1990 | Japan | 379/420 |
| 2174578 | 11/1986 | United Kingdom | 379/420 |

OTHER PUBLICATIONS

DAK Industries Inc., Popular Science Aug. 1983, *Headphone Phone*.

*Primary Examiner*—Reinhard J. Eisenzopf
*Assistant Examiner*—Lisa Charouel
*Attorney, Agent, or Firm*—Burns, Doane, Swecker & Mathis

[57] ABSTRACT

The invention relates to a hands-free module (2) for a mobile telephone (1). The hands-free module comprises a housing (11) and a cord (13) extending therefrom. Connected to the end of the cable distal from the housing is an external phone unit (14) and an external microphone (15). Mounted on the module is a connector (12) which connects the module housing (11) mechanically to the telephone housing (3) and which also connects the external phone unit (14) and the external microphone (15) electrically to the respective circuits of the internal loudspeaker and the internal microphone of the mobile telephone. The choice between the external and internal microphones is effected by a switch.

1 Claim, 2 Drawing Sheets

HANDS-FREE MODULE

This application is a continuation, of application Ser. No. 07/715,585, filed Jun. 14, 1991, now abandoned.

BACKGROUND OF THE INVENTION

The present invention relates to a hands-free module for a mobile telephone of the kind which includes a housing which houses electronic circuits of which one circuit is intended for an internal loudspeaker and one circuit is intended for an internal microphone.

Mobile telephones, particularly pocket-type mobile telephones and portophones are intended to be carried by hand or in a holster. It is necessary to hold the telephone in one hand when receiving or making a telephone call, which is disadvantageous when the subscriber is occupied with other work, for instance a construction worker on a construction site who holds constructions drawings in his hands while, at the same time, communicating, via the mobile telephone, with a constructional engineer seated in his office. A similar situation is one in which a person is seated and working on a portable computer while simultaneously talking into the telephone.

DISCLOSURE OF THE INVENTION

The present invention relates to a hands-free module which leaves both hands of the subscriber free during a telephone call, wherein the mobile telephone is kept in the holster or in some other place and the subscriber has a head-set or some corresponding device which is connected to the mobile telephone either directly or through the intermediary of a separate external housing connected mechanically and electrically to the mobile telephone.

No separate telephone holder shall be required when receiving or making a telephone call.

BRIEF DESCRIPTION OF THE DRAWINGS

The present invention will now be described in more detail with reference to the accompanying drawings, in which.

BEST MODE OF CARRYING OUT THE INVENTION

Figure 1:
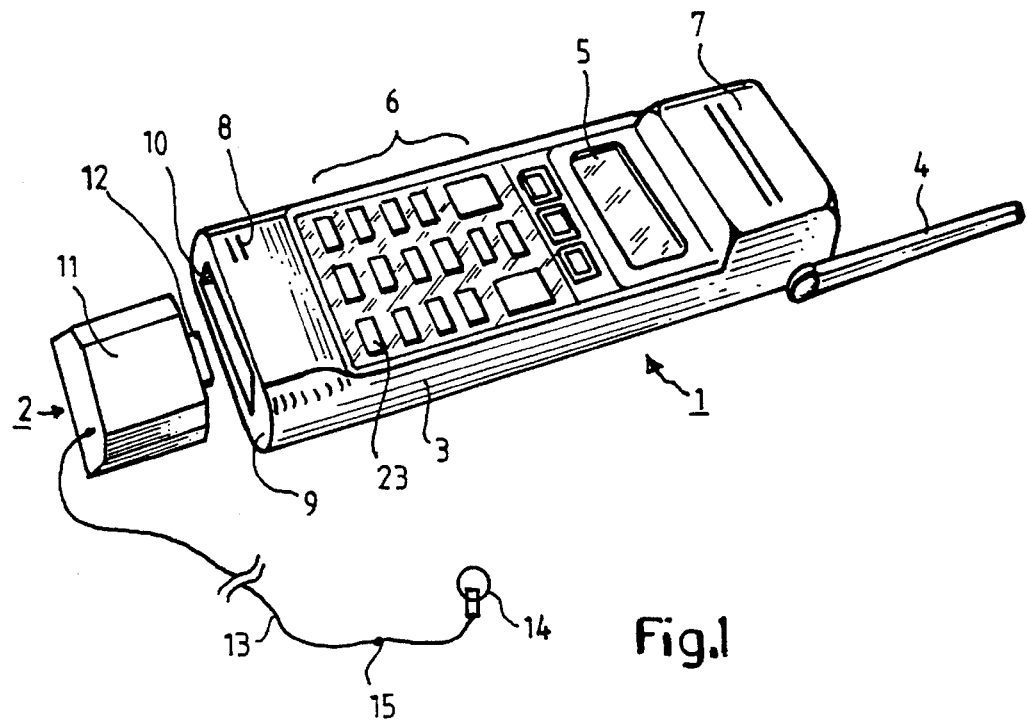
FIG. 1 is a perspective view of a pocket-type mobile telephone and of a hands-free module constructed in accordance with the present invention.

FIG. 1 illustrates a mobile telephone 1 and a hands-free module 2 constructed in accordance with the present invention. The mobile telephone 1 comprises, in a conventional manner, a housing 3, an antenna 4, a display window 5 and a keyboard 6 for the dialling of telephone numbers. The housing 1 accommodates conventional electronic circuits for dialling, ringing and transmitting purposes, and also a circuit for an internal loudspeaker 7, and a further circuit for an internal microphone 8. These two latter units are positioned, for instance, in the manner illustrated in FIG. 1. The housing has a base wall 9 fitted with an electric contact device 10, as described hereinafter.

The module 2 includes a housing 11 which is external to the mobile telephone and the contours and size of which when seen in cross-section correspond to the contours of the telephone housing 3. Mounted in one wall of the housing 11 is an electrical contact 12 which is configured complementary to the electrical contact 10, so as to fit thereinto. Although not shown in FIG. 1, each electrical contact includes a plurality of mutually fitting connector pins. The electrical contact 12 projects from the housing and is a male-type connector, whereas the connector 10 is a female-type connector. The arrangement is such that when the male connector or plug 12 is inserted into the female connector 10, the module 2 is connected mechanically to the mobile telephone 1 while electrical components in the module are connected electrically with certain electrical circuits in the mobile telephone 1, as described in more detail herebelow. When the units 1 and 2 are connected together, the module 2 is seated firmly on the mobile telephone 1 and appears to be an integral part of said telephone, since the shape and size of the hands-free module correspond to the shape and size of the mobile telephone.

Extending from the module housing 11 is an electrical cord or cable 13 which has an external phone unit 14 connected to the outer end thereof. The cord comprises several, insulated conductors. The phone unit may conveniently be a button-type earphone (so-called walk-man-type). A small external microphone 15 is soldered firmly to one of the conductors of said cord or cable 13, inwardly of the outer end of said cord. The microphone 15 and the phone unit 14 are spaced some decimeters apart.

Although not shown, the external housing 11 has mounted therein a circuit board on which an electronic unit is mounted, as described in more detail with reference to FIG. 2.

Figure 2:
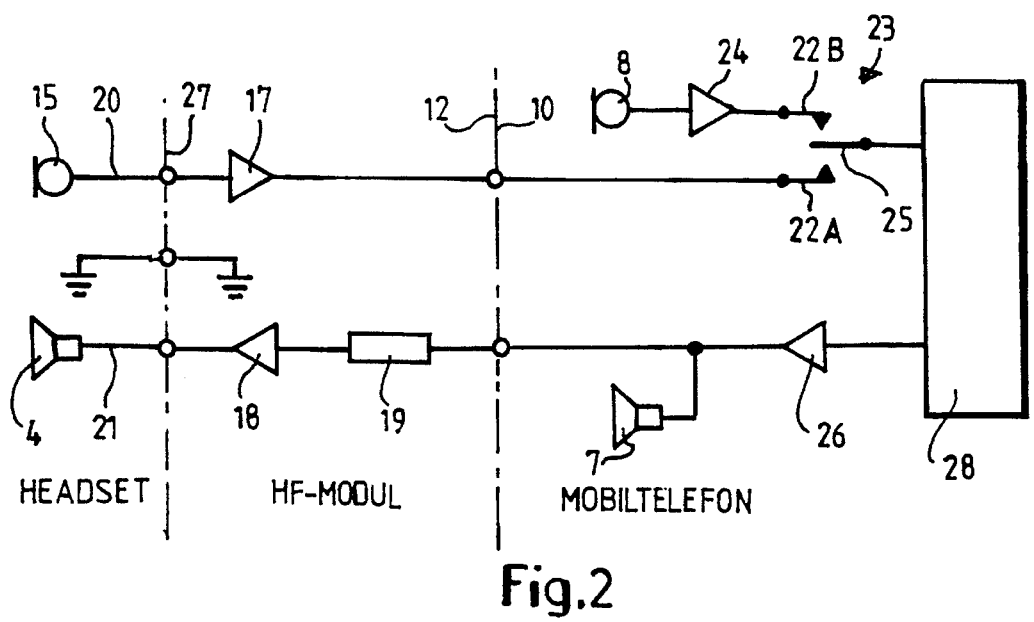
FIG. 2 is a circuit diagram for the inventive hands-free module.

As shown in FIG. 2, the electronic unit, here referenced 16, includes a microphone amplifier 17, a speaker amplifier 18 and a limiter 19. The cord 13 is preferably a screened conductor having two signal-conducting wires 20 and 21 respectively, and an earth conductor. The wire 20 connects the microphone 15 with the input of the microphone amplifier 17. The amplifier output is connected to one fixed contact 22A of a switch 23, via connector pins (not shown) in the male contact 12 and the female connector 10. The switch 23 has a second fixed connector 22B which is connected to the internal microphone 8 via a microphone amplifier 24. The switch 23 also includes a movable contact 25 which is connected to the transceiver unit of the mobile telephone. The switch 23 is preferably mounted on the mobile telephone 1, in the vicinity of the keyboard 6, and may be of the spring-back type for instance. In the FIG. 2 embodiment, the switch 23 is implemented in the form of a mechanical switch. According to the one preferred embodiment, the switch 23 is an electronic switch implemented by a transistor circuit which is activated by manipulating the button 40.

The mobile telephone is equipped with a transceiver unit 28 for transmitting and receiving radio signals.

The second wire 21 of the cord 13 connects the output of the speaker amplifier 18 to the external phone unit 14. The input of the speaker amplifier is connected to the output of the limiter 19, the input of which is connected directly to the internal loudspeaker 7 of the mobile telephone, via connector pins (not shown) in the connectors 12 and 10. The loudspeaker 7 is, in turn, connected to a speaker amplifier 26 included in the internal speaker circuit.

The wires 20, 21 and the earth conductor may be soldered directly to the circuit board (not shown) of the electronic unit 16, or may be connected to a schematically illustrated connector 27 which connects the cord to the electronic unit. This connector 27 is shown in broken lines in FIG. 2. As will be understood, the wire 20 is slightly shorter than the wire 21, so that the external microphone 15 will be located at the aforesaid distance from the external phone unit 14. The microphone 15 is preferably located at a distance of from 5 to 20 cm from the phone unit. When the phone unit is fitted in the subscriber's ear, the cord will hang down, gravitationally, such that the microphone 15 is located in a position in which the sound quality is fully satisfactory. The whole headset-assembly can be readily fitted with one hand, which is advantageous in the case of mobile telephony.

In normal use, all telephone traffic takes place through the mobile telephone 1. When the user wishes to have both hands free when making a telephone call, he connects the hands-free module 2 to the mobile telephone 1, and places the phone unit 14 in one ear and adjusts the cord 13 so that the microphone 15 will be suspended from said ear. The mobile telephone with the module connected thereto is put aside or put down, subsequent to dialling the number required. The internal microphone 8 can be disconnected, depending on the distance to the mobile telephone. The subscriber is now able to speak freely, while leaving both hands free.

When the user has finished his telephone conversation, the connection is broken in a conventional manner, for example by manipulating certain, predetermined buttons. The user can then carry on in the performance of his work, having both hands free, and be prepared to receive a telephone call.

As an alternative to the illustrated external phone unit 14 and the external microphone 15, a conventional headset equipped with headphones can be used. Such a headset includes a microphone which is mounted on a microphone support bar capable of being moved to a position in front of the user's mouth.

Figure 3:
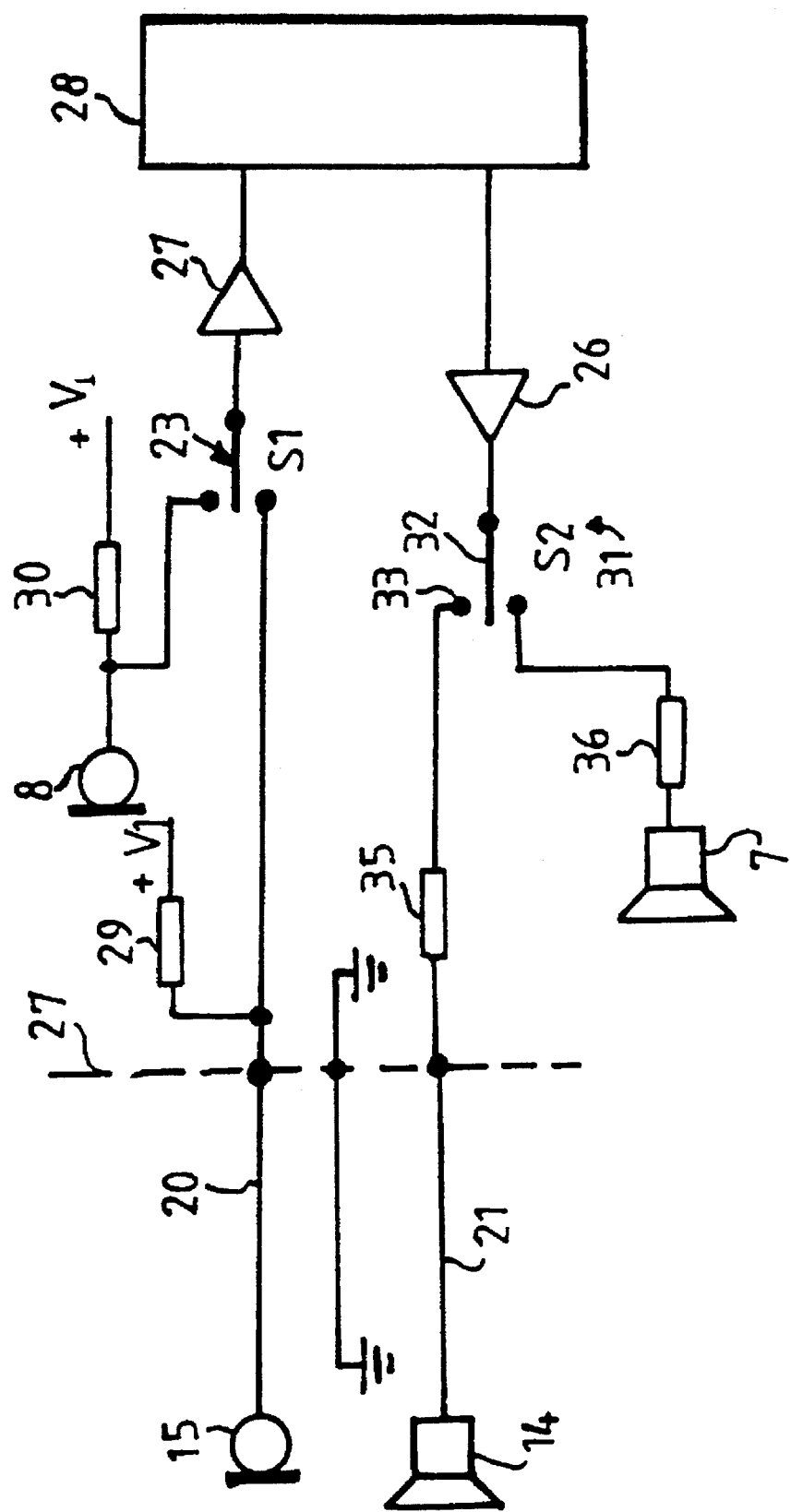
FIG. 3 is a circuit diagram of one embodiment in which the module is built into the mobile telephone.

FIG. 3 illustrates an embodiment in which the electronic unit of the module is connected to the transceiver unit 28 of the mobile telephone and which is initially incorporated in the telephone housing 3. The cord 13 of the external phone unit 14 and the external microphone 15 are connected directly to the housing 3 by means of the connector 27. This embodiment differs from the embodiment illustrated in FIG. 2, in that the microphone amplifier 17 is common to both the external and the internal microphones 15 and 8. It is necessary to connect the microphone resistors 29 and 30 between the voltage +V and the input of the microphone amplifier 17, and the resistors must be chosen so that the external and internal microphones will obtain the desired degree of sensitivity.

Similarly, the speaker amplifier 26 is common to both the external and the internal speakers. Speaker selection is made possible by means of a switch 31. The switch 31 has a movable contact 32 which can be moved between two fixed contacts 33, 34, of which the contact 33 is connected to the external phone unit 14, via a first speaker resistor 35, and the contact 34 is connected to the internal speaker 7, via a second speaker resistor 36. The speaker resistors 35, 36 are chosen so that the phone unit 14 and the speaker 7 will have the desired sensitivity.

Similar to the switch 23, the switch 32 is preferably implemented by a transistor circuit which is also activated by manipulating the button 40. Alternatively, the switch 31 can be manipulated by a separate button (not shown).

Each switch 23, 31 may, for instance, comprise a CMOS-transistor circuit of the 4053-type.

I claim:

1. A hands-free module for use with a mobile telephone, comprising:

a first microphone means;

ear phone means;

first connection means for connecting the first microphone means and said ear phone means;

a hands-free module housing provided with an insertion portion adapted for insertion into an opening provided in a housing of said mobile telephone, said insertion portion having a cross section corresponding to that of said opening, said hands-free module housing comprising:
microphone amplifier means for said first microphone means, limiter means for said ear phone means, and second connector means for connecting said amplifier means and said limiter means to microphone output means provided in said opening and for connecting said limiter means to loudspeaker output means provided in said opening.

* * * * *